US008289552B2

(12) United States Patent
Kaneko

(10) Patent No.: US 8,289,552 B2
(45) Date of Patent: Oct. 16, 2012

(54) IMAGE FORMING APPARATUS AND IMAGE FORMING METHOD

(75) Inventor: Masaru Kaneko, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 616 days.

(21) Appl. No.: 12/549,782

(22) Filed: Aug. 28, 2009

(65) Prior Publication Data

US 2010/0079792 A1 Apr. 1, 2010

(30) Foreign Application Priority Data

Oct. 1, 2008 (JP) ................................ 2008-256189

(51) Int. Cl.
*G06F 3/12* (2006.01)
*G06K 15/00* (2006.01)

(52) U.S. Cl. ..................................... 358/1.15; 358/1.14

(58) Field of Classification Search ........................ None
See application file for complete search history.

(56) References Cited

U.S. PATENT DOCUMENTS

| | | | |
|---|---|---|---|
| 5,194,879 | A | 3/1993 | Kotabe et al. |
| 2009/0021786 | A1 | 1/2009 | Kaneko |
| 2009/0073247 | A1 | 3/2009 | Kaneko et al. |

FOREIGN PATENT DOCUMENTS

| | | |
|---|---|---|
| JP | 62-126430 | 6/1987 |
| JP | 3-184060 | 8/1991 |
| JP | 4-59379 | 2/1992 |
| JP | 2002-49202 | 2/2002 |

OTHER PUBLICATIONS

U.S. Appl. No. 12/479,033, filed Jun. 5, 2009, Kaneko.

*Primary Examiner* — Marivelisse Santiago Cordero
*Assistant Examiner* — Mesfin Getaneh
(74) *Attorney, Agent, or Firm* — Oblon, Spivak, McClelland, Maier & Neustadt, L.L.P.

(57) ABSTRACT

A determining unit calculates an estimated time until drawing data is transmitted to an engine, and transmits the drawing data, a print instruction, and the estimated time to the engine. An activating/terminating unit activates or terminates each unit of the engine. A confirming unit inquires the controller of presence of drawing data of a next page, and acquires an estimated time. An activation/termination controlling unit controls the activating/terminating unit when it is judged that the estimated time is longer than a sum of a time required for activating units of the engine and a time required for terminating the units.

12 Claims, 15 Drawing Sheets

IMAGE FORMING APPARATUS AND IMAGE FORMING METHOD

CROSS-REFERENCE TO RELATED APPLICATIONS

The present application claims priority to and incorporates by reference the entire contents of Japanese Patent Application No. 2008-256189 filed in Japan on Oct. 1, 2008.

BACKGROUND OF THE INVENTION

1. Field of the Invention

The present invention relates to an image forming apparatus and an image forming method in the image forming apparatus, and more particularly, to an image forming apparatus and an image forming method for performing a printing by controlling each unit of an engine.

2. Description of the Related Art

A general image forming apparatus such as a printer and a multifunction product (MFP) includes a controlling unit that develops printing data into drawing data in accordance with an instruction to execute printing received from an operation panel or a personal computer (PC) or the like connected to a communication network, and an engine that controls a photosensitive body, a charging unit, an optical writing unit, a developing unit, a separating unit, a cleaning unit, and the like to print the drawing data developed by the controlling unit on a sheet.

For example, upon receiving the drawing data from the controller, the engine charges the photosensitive body, and then operates the optical writing unit to form an electrostatic latent image on the photosensitive body. Thereafter, the engine transcribes a toner image on a sheet fed by a paper feeding unit. The engine heats and pressurizes the sheet on which the toner image is transcribed, and fixes the toner image on the sheet. Printing is completed by performing a series of the processing (Japanese Patent Application Laid-open No. 2002-49202).

FIG. 14 is a timing chart for explaining the processes of activating the units of the engine, such as the charging unit, the developing unit, the transcribing unit, the separating unit, and the cleaning unit, then executing printing, and terminating the printing when the engine has received drawing data from the controller in the conventional image forming apparatus.

As shown in FIG. 14, in the conventional image forming apparatus, when a print start instruction is received from the controller, the engine is activated (P1), the charging unit, the developing unit, and the transcribing unit are activated, and then the separating unit is activated. After completing the activation of the separating unit, the activation of the engine is completed (P2). The period from P1 to P2 is called a process activation period Ta in FIG. 14.

After completing the activation of each unit, the engine performs a series of the processing for printing the drawing data received from the controller such as light exposure for forming an electrostatic latent image, development for forming a toner image by supplying a toner from the developing unit to the electrostatic latent image on the photosensitive body, transcription for transcribing the toner image on the photosensitive body onto a sheet by a transcription voltage of the transcribing unit, and separation for separating the sheet on which the toner image is transcribed from the photosensitive body by a separation voltage of the separating unit (process printing period Tb).

After a predetermined period of time in the process printing period Tb, the engine confirms whether an instruction to start printing a next page is sent from the controller, and when no instruction is sent to start printing in a predetermined period of time, terminates the charging unit (P3). Thereafter, similarly to the activation of each unit of the engine, the developing unit, the transcribing unit, and the separating unit are terminated, and the cleaning unit is actuated. When the cleaning unit ends the operation, termination of each unit of the engine ends (P4). The period from P3 to P4 is called a process termination period Tc in FIG. 14.

As can be seen, in the image forming apparatus, each unit of the engine is terminated when no instruction to start printing a next page is sent during printing (Tb). This is because when no instruction to start printing is sent in a predetermined period of time, the engine determines that printing has been completed or an abnormality has occurred and attempts to end the printing.

Drawing data may have a large data amount, or include several pages with high image quality, therefore, it takes a long time for the controller to develop the printing data of the pages into the drawing data, thereby preventing the controller from instructing print start in a predetermined period of time. In such a case, an instruction to start printing a next page is received after starting termination of each unit of the engine in the conventional image forming apparatus as shown in FIG. 15. The charging unit, the developing unit, and the like can be activated only after all of the charging unit, the developing unit, and the like are terminated. The time for printing becomes unnecessarily long, and due to reactivation of the units of the engine, the units are degraded more, and thus the service life of the image forming apparatus is shortened.

SUMMARY OF THE INVENTION

It is an object of the present invention to at least partially solve the problems in the conventional technology.

According to one aspect of the present invention, there is provided an image forming apparatus including a controller that issues a print instruction and an engine that performs a printing in response to the print instruction from the controller. The controller includes a determining unit that calculates an estimated time until drawing data for each page to be used in the printing is transmitted to the engine, and transmits the drawing data for each page, an instruction to print the drawing data for each page, and the estimated time to the engine. The engine includes an activating/terminating unit that activates or terminates each unit of the engine, a confirming unit that judges whether the print instruction for each page is received, and when the print instruction for each page is not received, inquires the controller of whether there is drawing data of a next page, and when it is confirmed that there is the drawing data of the next page, acquires the estimated time to judge whether the estimated time is longer than an activation/termination time that is a sum of a time required for activating each unit of the engine and a time required for terminating each unit of the engine, and an activation/termination controlling unit that controls the activating/terminating unit to activate or terminate each unit of the engine when it is judged that the estimated time is longer than the activation/termination time.

Furthermore, according to another aspect of the present invention, there is provided an image forming method for an image forming apparatus including a controller that issues a print instruction and an engine that performs a printing in response to the print instruction from the controller. The image forming method includes determining including the controller calculating an estimated time until drawing data for each page to be used in the printing is transmitted to the engine and transmitting the drawing data for each page, an instruction to print the drawing data for each page, and the estimated time to the engine and activating/terminating including the engine activating or terminating each unit of the engine, judging whether the print instruction for each page is received, and when the print instruction for each page is not received, inquiring the controller of whether there is drawing data of a next page, and when it is confirmed that there is the drawing data of the next page, acquiring the estimated time to judge whether the estimated time is longer than an activation/termination time that is a sum of a time required for activating each unit of the engine and a time required for terminating each unit of the engine, and activating or terminating each unit of the engine when it is judged that the estimated time is longer than the activation/termination time.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image forming apparatus according to the present invention are explained in detail below with reference to the accompanying drawings.

In an embodiment of the present invention, the image forming apparatus is applied to a laser printer. Although the image forming apparatus is applied to a laser printer in the following example, the image forming apparatus is applicable to any device other than a laser printer as long as the device has a printing function, such as a multifunction product called multifunction peripheral (MFP) in which a copying function, a facsimile (FAX) function, a printing function, and a scanning function are realized in a single housing.

Figure 1:
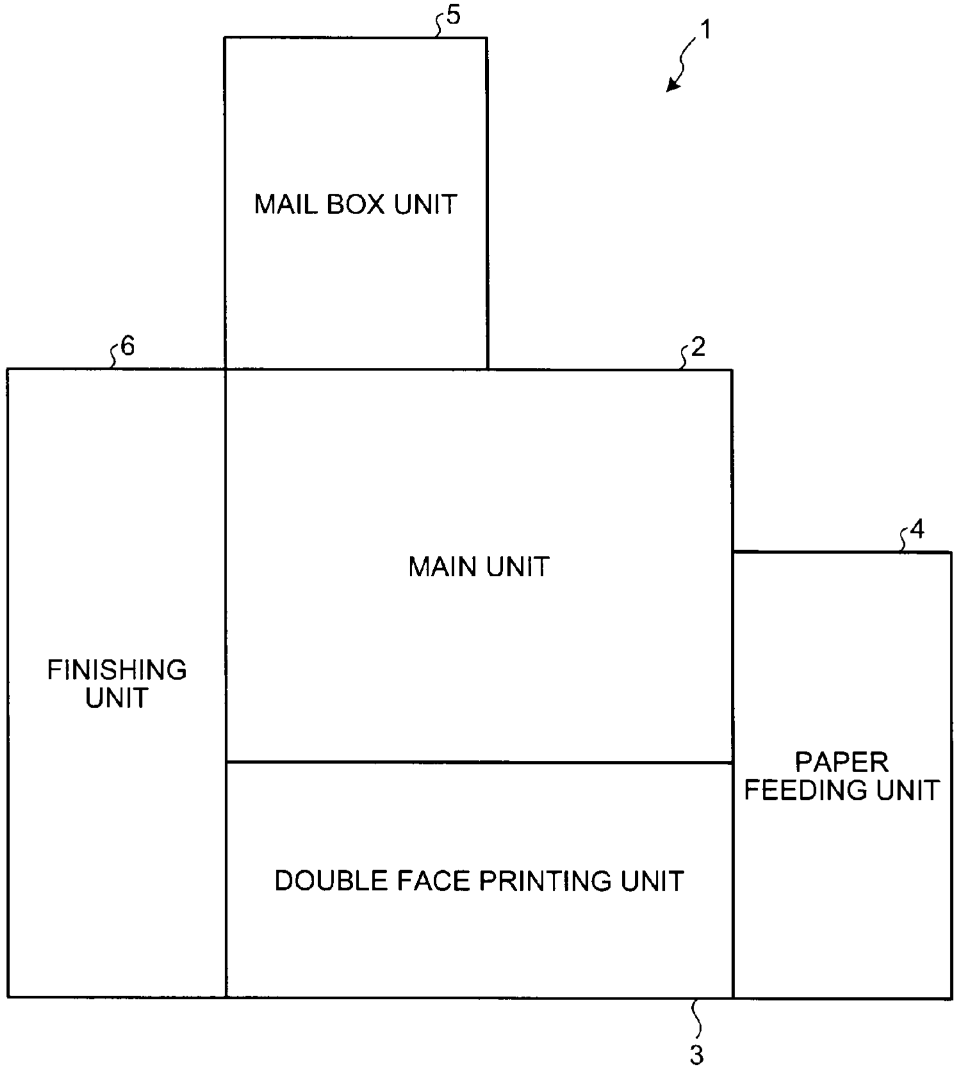
FIG. 1 is a block diagram of a physical arrangement of a laser printer according to a first embodiment of the present invention.
Figure 2:
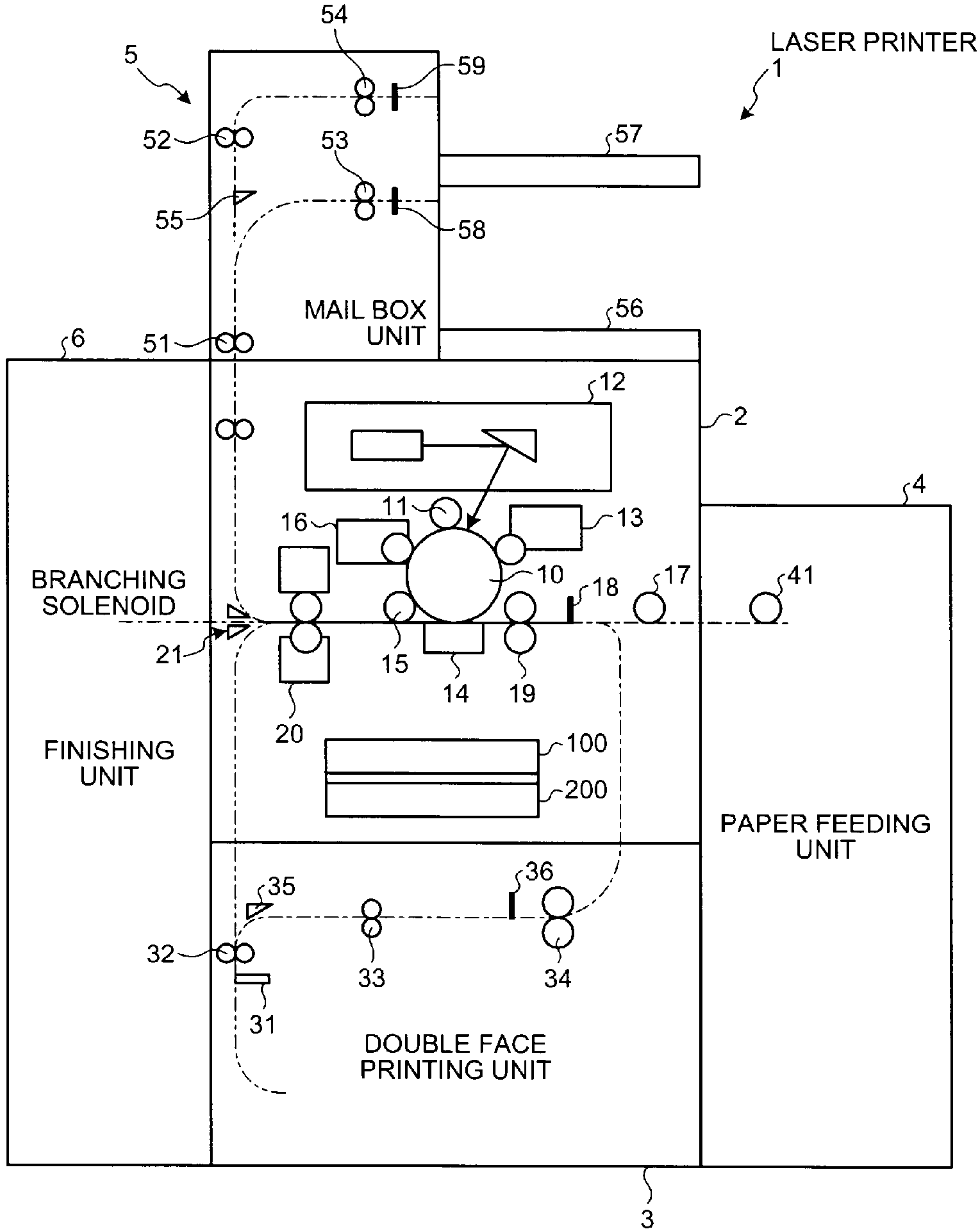
FIG. 2 is a schematic of a physical configuration of a main unit, a double face printing unit, and a mail box unit of the laser printer shown in FIG. 1.

FIG. 1 is a block diagram of a physical arrangement of a laser printer 1 according to a first embodiment of the present invention. As shown in FIG. 1, the laser printer 1 includes a main unit 2, a double face printing unit 3, a paper feeding unit 4, a mail box unit 5, a finishing unit 6, and an operation panel 7 (not shown). FIG. 2 is a schematic of a physical configuration of the main unit 2, the double face printing unit 3, and the mail box unit 5.

As shown in FIG. 2, the main unit 2 includes a photosensitive body 10, a charging unit 11, an optical writing unit 12, a developing unit 13, a transcribing unit 14, a separating unit 15, a cleaning unit 16, a controller 100, and an engine 200.

The charging unit 11, the optical writing unit 12, the developing unit 13, the transcribing unit 14, the separating unit 15, and the cleaning unit 16 are provided around the photosensitive body 10, and perform various types of processing such as latent image formation for printing according to an instruction from the controller 100 explained below. On a path for conveying a sheet (printed medium) indicated by broken lines, a paper feeding roller 17, a registration sensor 18, registration rollers 19, a fixing unit 20, and path switch-over nails 21 are sequentially provided for conveyance of a sheet accumulated in the paper feeding unit 4.

The optical writing unit 12 includes a light source, a polygon mirror, and an irradiation mirror. The light source emits laser light. The polygon mirror is driven to rotate at an angular velocity according to the pixel density of printing data, and deflects and reflects laser light emitted from the light source in the main scanning direction. In this manner, the irradiation mirror irradiates the photosensitive body 10 with laser light reflected by the polygon mirror. The optical writing unit 12 forms an electrostatic latent image of printing data on the photosensitive body 10.

When a sheet accumulated in the paper feeding unit 4 is conveyed by the paper feeding roller 17 and the registration rollers 19, the registration sensor 18 detects the presence of the sheet being conveyed, and adjusts the position of the sheet so that the sheet overlaps with the position of the electrostatic latent image formed in the photosensitive body 10.

The photosensitive body 10, the paper feeding roller 17, and the like are driven by motors (not shown). The photosensitive body 10 is charged uniformly by the charging unit 11, and an electrostatic latent image is formed thereon when the optical writing unit 12 irradiates the photosensitive body 10 with laser light. A supplying unit (not shown) supplies toner to the photosensitive body 10 on which the electrostatic latent image is formed to form a toner image.

The transcribing unit 14 transcribes the toner image formed on the photosensitive body 10 on a sheet conveyed from the paper feeding unit 4 or the double face printing unit 3. The transcribing unit 14 separates a sheet on which the toner image is transcribed from the photosensitive body 10 with separation voltage supplied from the separating unit 15, and conveys the sheet to the fixing unit 20.

The fixing unit 20 heats and pressurizes the sheet on which the toner image is transcribed and that is separated from the photosensitive body 10 by the separating unit 15 to fix the toner image on the sheet. Thereafter, the sheet on which the toner image is fixed is conveyed to the mail box unit 5, the finishing unit 6, or the double face printing unit 3 by various rollers with the discharge destination being switched over by the path switch-over nails 21.

Operation of each unit of the main unit 2 is performed according to an instruction from the engine 200 as explained below.

Figure 3:
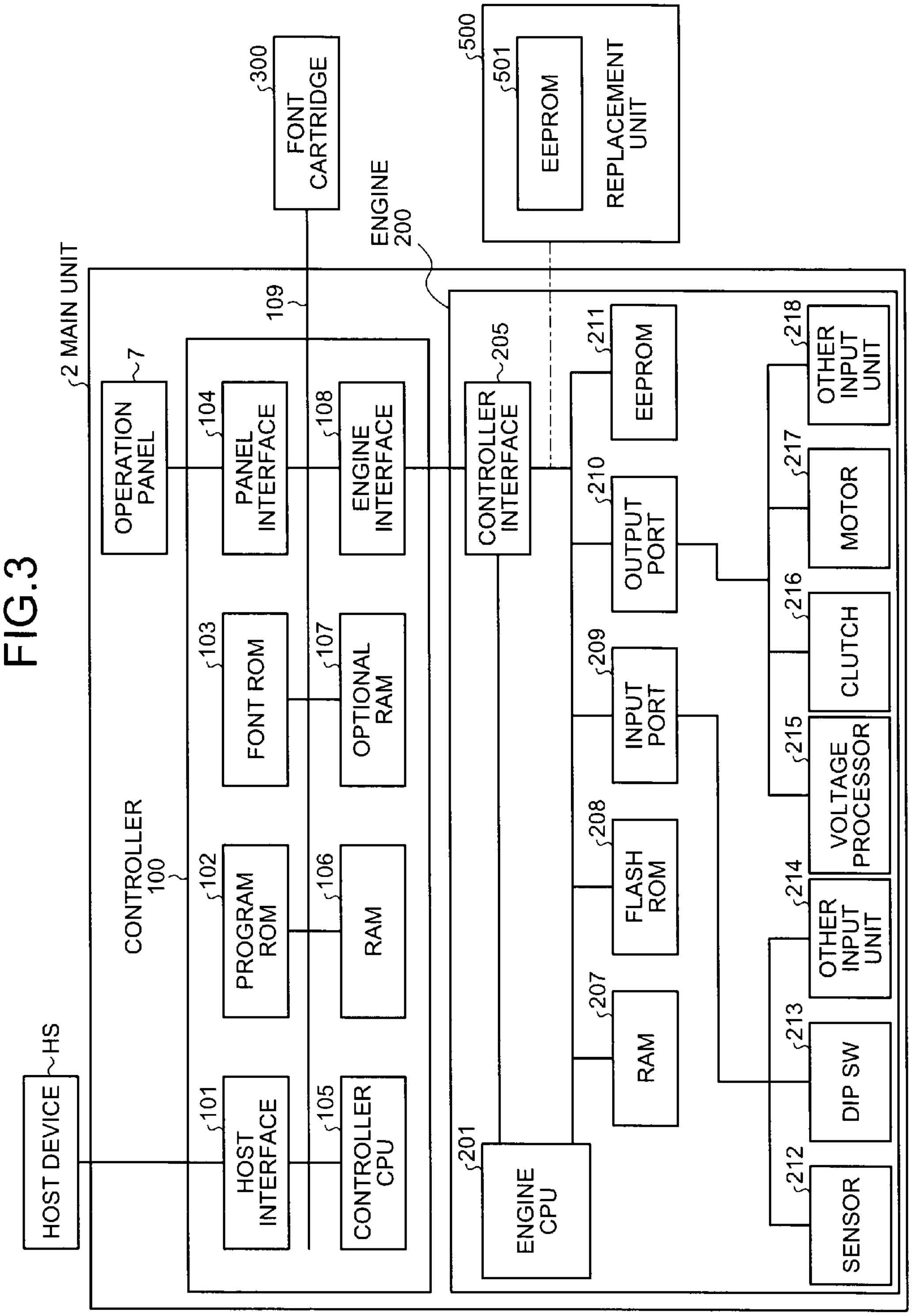
FIG. 3 is a schematic of a physical configuration of the main unit shown in FIG. 2.

FIG. 3 is a block diagram of a physical configuration of the controller 100, and the engine 200.

The controller 100 includes a host interface 101, a program read only memory (ROM) 102, a font ROM 103, a panel interface 104, a controller central processing unit (CPU) 105, a random access memory (RAM) 106, an optional RAM 107, an engine interface 108, and a bus 109.

The host interface 101 receives printing data and a control signal for printing the printing data (print setting information and the like, such as the number of copies, the printing surface, and the paper type) transmitted from a host device HS connected to a communication network. The control signal is set for each page of the printing data.

The program ROM 102 is a storage medium such as a memory that stores therein a computer program for performing various types of processing by the controller 100 on the printing data.

The font ROM 103 is a storage medium such as a memory that stores therein various fonts to be used in printing by the laser printer 1.

The operation panel 7 is configured by a panel such as a liquid crystal display (LCD) and is used for specifying various operations such as operations for switching modes, fonts, or the like of the laser printer 1.

The panel interface 104 is an interface that mediates transmission of various types of information described above, between the operation panel 7 and the controller 100.

A font cartridge 300 is a storage medium that stores therein font types of characters, and is connected, by a user as necessary, to the controller 100.

The controller CPU 105 uses the RAM 106 as a work memory, and performs various types of processing such as developing printing data received from the host device HS into drawing data, and reading out the number of pages included in a control signal according to a computer program stored in the program ROM 102. The specific control by the controller CPU 105 is explained below.

The RAM 106 is a storage medium such as a memory that stores therein drawing data obtained by developing the printing data that the host interface 101 has received from the host device HS for each page.

The optional RAM 107 is a so-called auxiliary memory, and is used supplementarily when the capacity of the RAM 106 becomes insufficient.

The controller 100 includes a nonvolatile random access memory (NVRAM) or the like that stores therein data with content that needs to be retained even when the power supply of the laser printer 1 is turned off.

The engine interface 108 is an interface that mediates transmission of the control signal and the printing data described above, between the controller 100 and the engine 200.

The operation panel 7, the font cartridge 300, and a replacement unit 500 are connected to the controller 100. The replacement unit 500 is connected to the engine 200 so that various types of processing such as printing can be performed even when the engine malfunctions. The engine 200 is explained below.

The engine 200 issues an instruction related to printing such as print start and print end to the photosensitive body 10, the cleaning unit 16, the fixing unit 20, and the like.

As shown in FIG. 3, the engine 200 includes physically an engine CPU 201, interruption controlling circuits 202 and 203, a controller interface 205, an engine ROM 206, a RAM 207, a flash ROM 208, an input port 209, an output port 210, an electrically erasable and programmable (EEP) ROM (EEPROM) 211, a sensor 212, a dip switch (DIP SW) 213, an input unit 214, a voltage processor 215, a clutch 216, a motor 217, and an output unit 218.

The engine CPU 201 uses the RAM 207 as a work memory and controls the photosensitive body 10, the charging unit 11, the optical writing unit 12, and the like to perform processing on the drawing data received from the controller 100 according to a computer program stored in the engine ROM 206. Specific control is explained below.

The controller interface 205 mediates transmission of printing data and a control signal.

The input port 209 converts an analog signal from the sensor 212, the dip switch 213, and the input unit 214 into a digital signal, and outputs the digital signal to the engine CPU 201.

The output port 210 outputs the control signal from the engine CPU 201 to the voltage processor 215, the clutch 216, the motor 217, and the output unit 218.

The flash ROM 208 is a storage medium such as a memory that stores therein a computer program for controlling each unit of the engine 200 of the laser printer 1.

The EEPROM 211 is a storage medium that stores therein various types of information necessary for maintenance such as the type, the service life, and the model number of the replacement unit 500. The functional configuration of the main unit 2 is explained.

Figure 4:
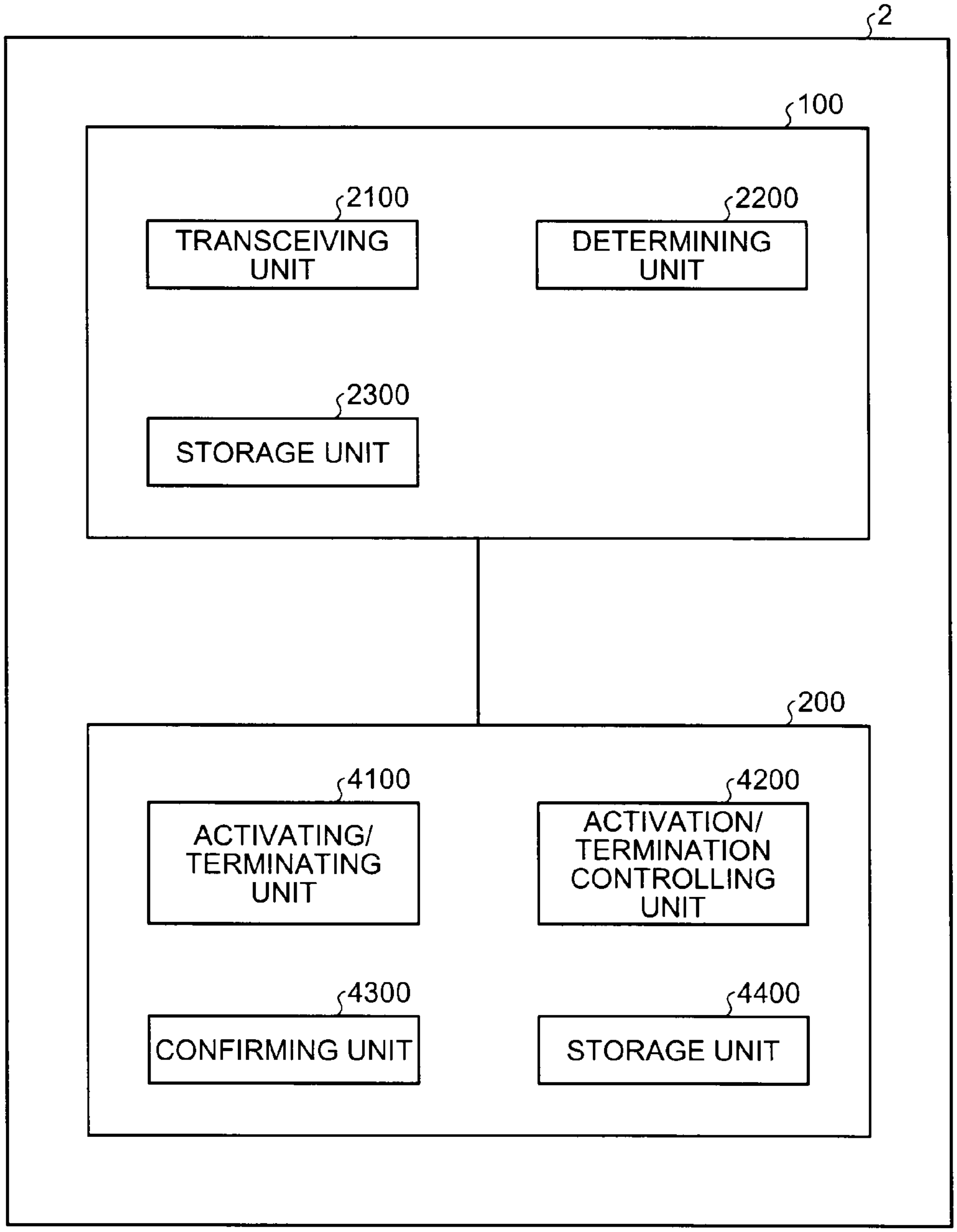
FIG. 4 is a block diagram of a functional configuration of the controller unit and the engine shown in FIG. 3.

FIG. 4 is a block diagram of the functional configuration of the controller unit 100 and the engine 200 of the main unit 2.

As shown in FIG. 4, the controller 100 includes a transceiving unit 2100, a determining unit 2200, and a storage unit 2300. The transceiving unit 2100 and the determining unit 2200 correspond to, for example, the controller CPU 105 shown in FIG. 3, and the storage unit 2300 corresponds to, for example, the RAM 106 shown in FIG. 3.

The transceiving unit 2100 receives the printing data and the control signal from the host device HS.

The determining unit 2200 reads out page information of the printing data (the number of fed pages, and page numbers, for example) received by the transceiving unit 2100 from the control signal. The determining unit 2200 reads out the printing data received by the transceiving unit 2100 for each page, and sequentially develops the printing data into the drawing data, and stores the drawing data in the storage unit 2300.

The determining unit 2200 also calculates a time (hereinafter, "estimated time") required for developing the printing data into the drawing data and storing the drawing data in the storage unit 2300 for each page, and then transmitting the developed drawing data to the engine 200. The estimated time is calculated based on, for example, the data amount of the drawing data and the processing speed of the controller 100.

Upon completion of calculating the estimated time, the determining unit 2200 transmits the drawing data developed and stored in the storage unit 2300 to the engine 200, and instructs the engine 200 to start printing. In the following example, calculation of the estimated time, transmission of the drawing data to the engine 200, and instruction to start printing the drawing data are performed for each page of the printing data.

In other words, after the determining unit 2200 develops the printing data of the first page into the drawing data, and transmits an instruction to start printing as well as the developed drawing data to the engine 200, the determining unit 2200 calculates an estimated time for the drawing data of the second page. Thereafter, similarly to the drawing data of the first page, the drawing data and the instruction to start printing are sequentially transmitted to the engine 200 up to the maximum value of the number of the pages read out from the control signal (that is, for all the pages).

When the determining unit 2200 is inquired by the engine 200 of whether there is drawing data of a next page, the determining unit 2200 replies whether there is drawing data of a next page. When the determining unit 2200 is requested by the engine 200 to confirm the estimated time, the determining unit 2200 notifies the engine 200 of the estimated time of the drawing data of the next page.

The storage unit 2300 is a storage medium such as a memory that stores therein the drawing data that is received by the transceiving unit 2100, and is developed from the printing data. The engine 200 is explained below.

As shown in FIG. 4, the engine 200 includes an activating/terminating unit 4100, an activation/termination controlling unit 4200, a confirming unit 4300, and a storage unit 4400. The activating/terminating unit 4100, the activation/termination controlling unit 4200, and the confirming unit 4300 correspond to, for example, the engine CPU 201 shown in FIG. 3, and the storage unit 4400 corresponds to, for example, the RAM 207 shown in FIG. 3.

The activating/terminating unit 4100 sequentially activates or terminates the units such as the charging unit 11, the optical writing unit 12, the developing unit 13, the transcribing unit 14, the separating unit 15, and the cleaning unit 16 according to an instruction from the activation/termination controlling unit 4200.

When the activating/terminating unit 4100 receives an instruction to print the drawing data (hereinafter, "print execution instruction") from the activation/termination controlling unit 4200 after activating each of the units, the activating/terminating unit 4100 starts printing.

Upon receiving an instruction to start printing from the controller 100, the activation/termination controlling unit 4200 instructs the activating/terminating unit 4100 to sequentially activate each of the units described above.

Upon receiving the drawing data from the controller 100, the activation/termination controlling unit 4200 stores the received drawing data in the storage unit 4400. After completing activation of the units such as the charging unit 11, the optical writing unit 12, the developing unit 13, the transcribing unit 14, the separating unit 15, and the cleaning unit 16, the activation/termination controlling unit 4200 sends a print execution instruction to the activating/terminating unit 4100 on the drawing data stored in the storage unit 4400. In the following, the time period during which the drawing data is printed according to a print execution instruction is called a process printing period (Tb).

After sending the print execution instruction on the drawing data to the activating/terminating unit 4100, the activation/termination controlling unit 4200 judges whether it is instructed by the controller 100 to start printing drawing data of a next page. When the activation/termination controlling unit 4200 is instructed to start printing drawing data of a next page, it continues the printing.

When the confirming unit 4300 is notified that there is no drawing data of a next page by the controller 100, the activation/termination controlling unit 4200 determines that the printing of the printing data has been completed, and instructs the activating/terminating unit 4100 to sequentially terminate the units such as the charging unit 11, the optical writing unit 12, the developing unit 13, the transcribing unit 14, the separating unit 15, and the cleaning unit 16.

When it is judged that the activation/termination controlling unit 4200 is not instructed to start printing drawing data of a next page, the confirming unit 4300 inquires the controller 100 of whether there is drawing data of a next page.

When the confirming unit 4300 has received a reply that there is drawing data of a next page from the controller 100, the confirming unit 4300 receives an estimated time for the drawing data of the next page from the controller 100. The confirming unit 4300 judges whether the received estimated time is longer than the sum of a time period required for activating the units such as the charging unit 11, the optical writing unit 12, the developing unit 13, the transcribing unit 14, the separating unit 15, and the cleaning unit 16 (hereinafter, "process activation period Ta") and a time period required for terminating these units (hereinafter, "process termination period Tc").

When it is judged that the estimated time is longer than the activation/termination time, the confirming unit 4300 terminates the units described above and then reactivates the units. On the other hand, when it is determined that the estimated time is not longer than the activation/termination time, the confirming unit 4300 waits until the estimated time lapses without terminating and reactivating the units.

Furthermore, the confirming unit 4300 judges, after completing terminating and reactivating the units or after the estimated time lapses, whether drawing data of a next page is stored in the storage unit 4400, and when it is judged that drawing data of a next page is not stored in the storage unit 4400, the confirming unit 4300 inquires again the controller 100 of whether there is drawing data of a next page. Returning to FIG. 2, the double face printing unit 3 is explained.

While the confirming unit 4300 acquires the estimated time during printing in the following example, the confirming unit 4300 may instead acquire the estimated time during activation or termination of each unit of the engine 200 or acquire the estimated time by performing other processes than printing, for example, by performing interruption during printing, as far as the estimated time has been calculated by the controller 100.

Returning to FIG. 1, the double face printing unit 3 prints printing data on a top surface and a back surface of a sheet by inverting the sheet in double face printing of the printing data. Specifically, the double face printing unit 3 detects a sheet by an entrance sheet sensor 31, inverts the top/back surfaces of the sheet with inverting rollers 32 to 34 and a separating nail 35, feeds the sheet to the registration rollers 19 of the main unit 2, and detects the inverted sheet to be fed with a double face exit sheet sensor 36.

The paper feeding unit 4 accumulates sheets therein. Specifically, the paper feeding unit 4 includes a plurality of paper feed trays, a paper feeding mechanism that separates sheets in the paper feed trays and feeds them sheet by sheet, and a send-out roller 41 that sends out fed sheets to the main unit 2.

A plurality of sheets of different types and different sizes can be set in each of the paper feed tray of the paper feeding unit 4.

The mail box unit 5 discharges sheets on which printing data is printed when printing of the printing data is finished. Specifically, the mail box unit 5 includes a plurality of conveyor rollers 51 to 54, a discharged paper nail 55, two discharged paper trays 56 and 57, and paper discharge sensors 58 and 59 that detect discharging of sheets that are recorded thereon with data to the discharged paper trays 56 and 57, respectively. When a printed sheet is sent in, the discharged paper nail 55 changes the discharge direction of the sheet, and then the sheet is discharged to the touch-panel discharged paper tray 57 by the conveyor rollers 51 to 54.

The finishing unit 6 performs various types of post-processing, such as stapling and folding a sheet on which printing data is printed by the main unit 2.

The procedure of printing performed by the laser printer 1 is explained.

Figure 5:
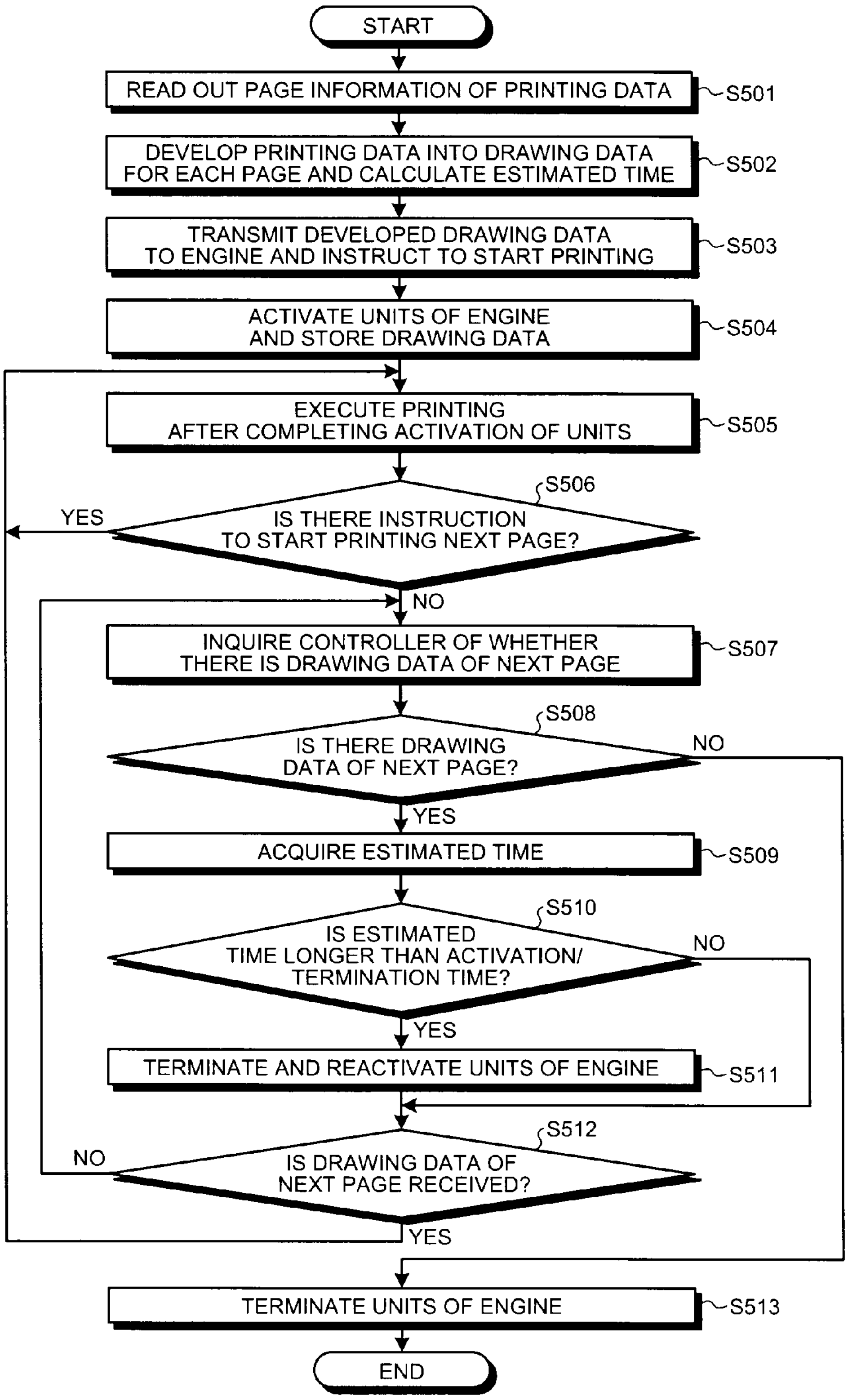
FIG. 5 is a flowchart of processing procedure from the start to the end of data printing according to the first embodiment.

FIG. 5 is a flowchart of processing procedure from the start to the end of data printing when printing data is received from the host device HS. In the following example, it is assumed that the transceiving unit 2100 of the controller 100 has received the printing data, and a control signal from the host device HS.

The determining unit 2200 reads out the control signal of the printing data received by the transceiving unit 2100 and acquires page information (Step S501). The determining unit 2200 reads out the printing data for each page, sequentially develops the printing data into drawing data and stores the drawing data in the storage unit 2300, and calculates an estimated time (Step S502).

Thereafter, the determining unit 2200 transmits the drawing data to the engine 200 and instructs the engine 200 to start printing (Step S503).

Upon receiving an instruction to start printing from the controller 100, the activation/termination controlling unit 4200 controls the activating/terminating unit 4100 to activate the charging unit 11, the optical writing unit 12, the developing unit 13, the transcribing unit 14, the separating unit 15, the cleaning unit 16, and the like, and stores the drawing data in the storage unit 4400 (Step S504).

Thereafter, the activation/termination controlling unit 4200 sends a print execution instruction to the activating/terminating unit 4100, and the activating/terminating unit 4100 starts printing (Step S505).

When printing of the drawing data starts, the activation/termination controlling unit 4200 judges whether an instruction to start printing the drawing data of a next page has been received from the controller 100 (Step S506).

When it is judged that the activation/termination controlling unit 4200 has received an instruction to start printing drawing data of a next page (YES at Step S506), the activation/termination controlling unit 4200 continues the printing.

On the other hand, when it is judged that the activation/termination controlling unit 4200 has not received an instruction to start printing drawing data of a next page (NO at Step S506), the activation/termination controlling unit 4200 inquires the controller 100 of whether there is drawing data of a next page (Step S507).

The confirming unit 4300 confirms whether there is drawing page of a next page in response to the inquiry from the activation/termination controlling unit 4200 (Step S508).

When notified by the controller 100 that there is no drawing data of a next page (NO at Step S508), the confirming unit 4300 determines that the printing of the printing data has ended, the process proceeds to Step S513, and instructs the activating/terminating unit 4100 to sequentially terminate the charging unit 11, the optical writing unit 12, the developing unit 13, the transcribing unit 14, the separating unit 15, the cleaning unit 16, and the like, and the activating/terminating unit 4100 terminates the units (Step S513).

On the other hand, when notified by the controller 100 that there is drawing data of a next page (YES at Step S507), the confirming unit 4300 receives an estimated time of the drawing data of the next page from the controller 100 (Step S509).

The confirming unit 4300 judges whether the received estimated time is longer than the activation/termination time (Step S510).

When it is judged that the estimated time is longer than the activation/termination time (YES at Step S510), the activation/termination controlling unit 4200 controls the activating/terminating unit 4100 to terminate and then reactivate the units (Step S511)

On the other hand, when the confirming unit 4300 judges that the estimated time is not longer than the activation/termination time (NO at Step S510), the process proceeds to Step S512.

After Step S510 or S511, the confirming unit 4300 judges whether the drawing data of a next page is stored in the storage unit 4400 (Step S512).

When it is judged that drawing data of a next page is stored in the storage unit 4400 (YES at Step S512), the process returns to Step S505, the activation/termination controlling unit 4200 sends a print execution instruction to the activating/terminating unit 4100, and the activating/terminating unit 4100 starts printing.

On the other hand, when it is judged that drawing data of a next page is not stored in the storage unit 4400 (NO at Step S512), the process returns to Step S507, and the confirming unit 4300 inquires again the controller 100 of whether there is drawing data of a next page. When the processing of Steps S501 to S513 ends, all the printing processing performed by the laser printer 1 ends.

Figure 6:
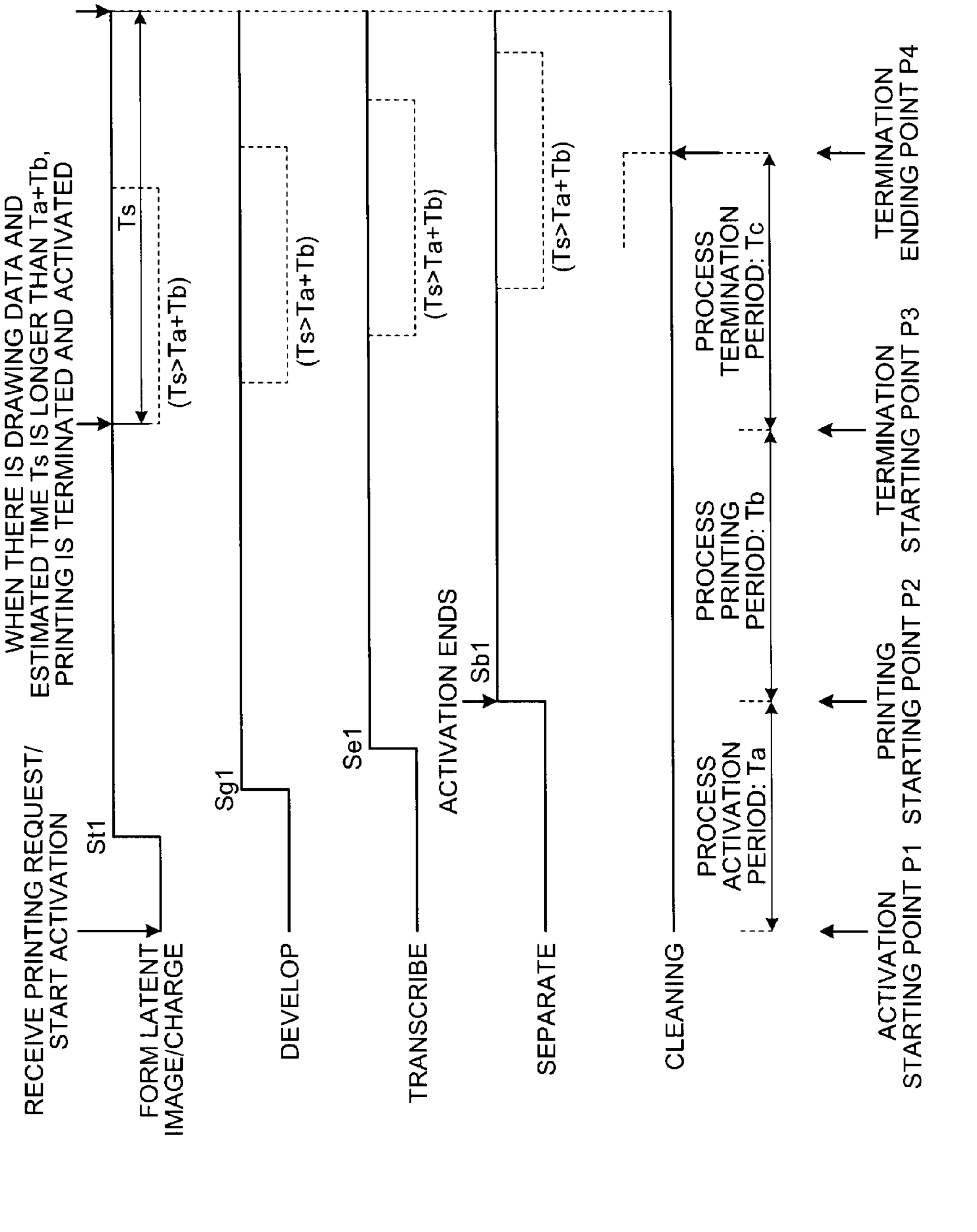
FIG. 6 is a timing chart for explaining the printing according to the first embodiment in a time series (when an estimated time is longer)
Figure 7:
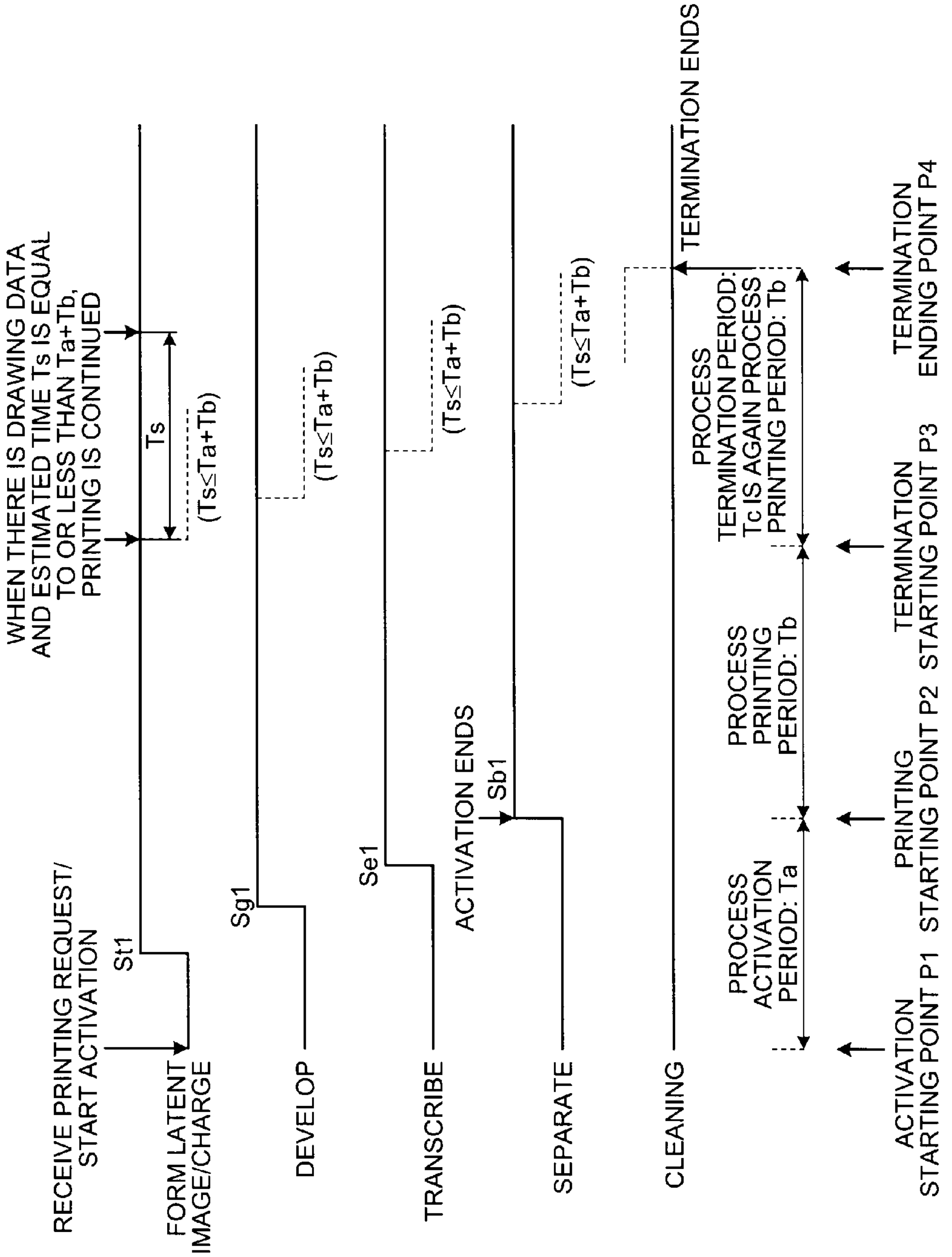
FIG. 7 is a timing chart for explaining the printing according to the first embodiment in a time series (when an estimated time is shorter)

FIGS. 6 and 7 are timing charts for explaining the printing in a time series.

In FIG. 6, "FORM LATENT IMAGE/CHARGE" indicates the optical writing unit 12/the charging unit 11, "DEVELOP" indicates the developing unit 13, "TRANSCRIBE" indicates the transcribing unit 14, "SEPARATE" indicates the separating unit 15, and "CLEANING" indicates the cleaning unit 16. FIG. 6 explains that the units are sequentially activated or terminated in accordance with a lapse of time.

As shown in FIG. 6, upon completion of the activation of the units and after the process activation period Ta, the activation/terminating unit 4100 starts printing according to a print execution instruction from the activation/termination controlling unit 4200, and the process printing period Tb starts.

When notified that there is drawing data of a next page, the confirming unit 4300 temporarily terminates and then reactivates the units of the engine 200 when the estimated time Ts is longer than the sum of the process activation period Ta and the process termination period Tc (activation/termination time).

On the other hand, when the estimated time Ts is not longer than the sum of the process activation period Ta and the process termination period Tc (activation/termination time), the confirming unit 4300 does not terminate or reactivate the units of the engine 200 as shown in FIG. 7, and continues the process printing period Tb.

As can be seen, in the present embodiment, when notified that there is drawing data of a next page by the controller 100, the engine 200 acquires an estimated time of the drawing data of the next page, and judges whether to terminate or reactivate the units of the engine 200 according to the length of the acquired estimated time. Accordingly, compared with the case of judging whether to execute printing or terminate or reactivate the units, simply in response to a print instruction from the controller 100, the unnecessary waiting time for printing can be skipped so that efficient printing can be performed. Furthermore, because the units of the engine 200 are not unnecessarily terminated or reactivated, the units of the engine 200 are degraded less, and the service life of the engine 200 and accordingly of the laser printer 1 can be made longer.

In the first embodiment, the controller 100 calculates an estimated time of drawing data based on the data amount of the drawing data and the processing speed of the controller 100, and the engine 200 compares the estimated time with an activation/termination time of each unit of the engine 200 so that efficient printing can be performed. However, when the pixel densities of the drawing data are different for each page, the rotational velocity of a polygon mirror of the optical writing unit 12 needs to be adjusted, and thus the units of the engine 200 need to be terminated and reactivated. In the following example, printing is performed when the pixel densities of the drawing data are different for each page.

Figure 8:
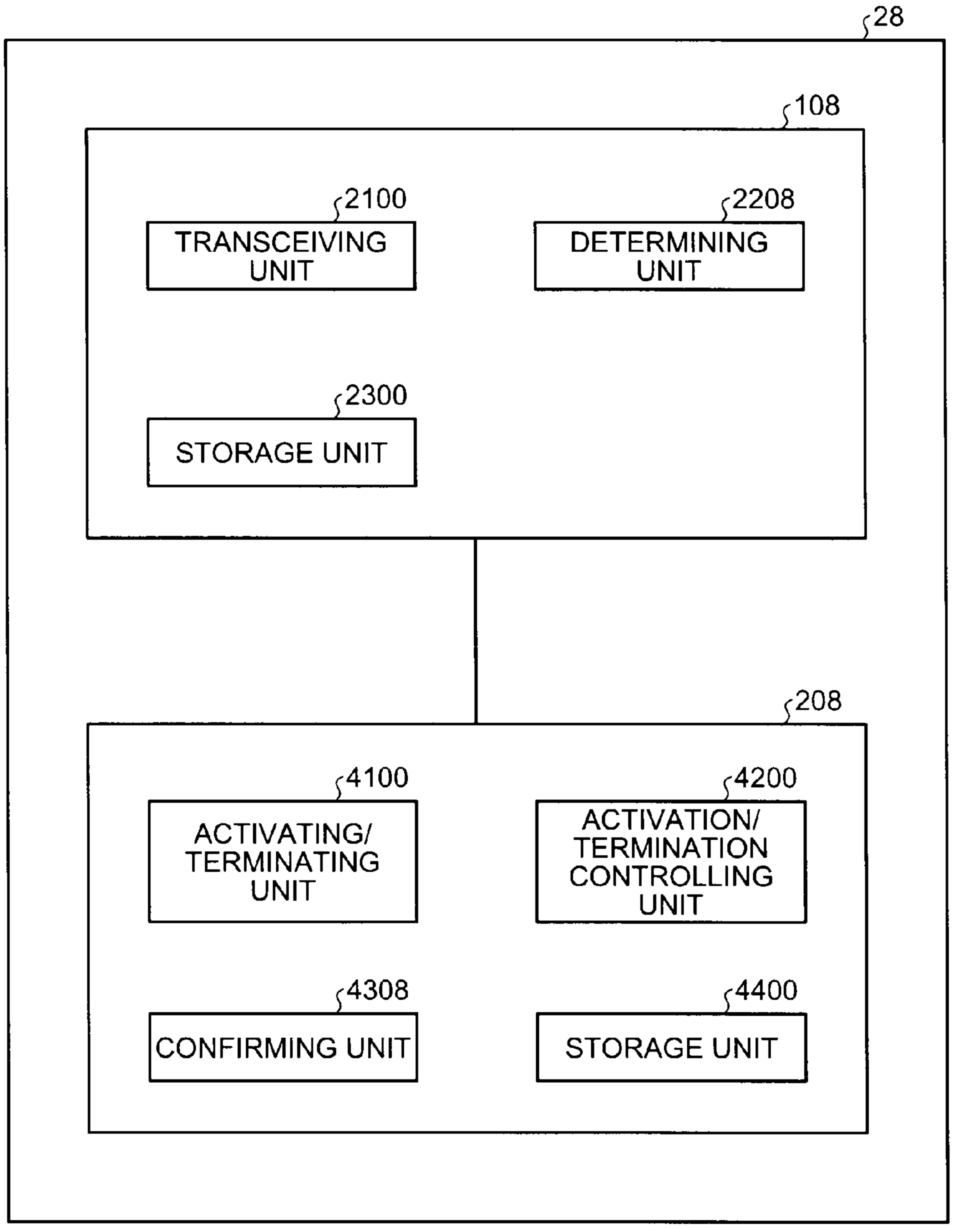
FIG. 8 is a block diagram of a functional configuration of a main unit according to a second embodiment of the present invention.

FIG. 8 is a block diagram of a functional configuration of a main unit 28 according to a second embodiment of the present invention. The main unit 28 according to the second embodiment is different from the main unit 2 according to the first embodiment in that the main unit 28 includes a controller 108 and an engine 208 different from the counterparts according to the first embodiment. In the following example, the same components as those of the first embodiment are given the same reference numerals and are not explained again. The controller 108 is now explained.

The controller 108 includes a determining unit 2208 different from the determining unit 2200 according to the first embodiment.

The determining unit 2208 performs processing similar to the processing that the determining unit 2200 according to the first embodiment performs, and additionally, calculates the pixel density of the drawing data, compares the pixel density of the drawing data having been transmitted to the engine 208 and that of the drawing data to be transmitted, and judges whether the pixel densities are equal to each other.

When requested to confirm the pixel densities by the engine 208, the confirming unit 2208 notifies the engine 208 of the judgment result about the pixel densities. The engine 208 is now explained.

The engine 208 is different from the engine 200 according to the first embodiment in that the engine 208 includes a confirming unit 4308 different from the confirming unit 4300 according to the first embodiment.

The confirming unit 4308 performs processing similar to the processing that the confirming unit 4300 according to the first embodiment performs, and additionally, requests to confirm whether the pixel density of drawing data of a next page and that of the drawing data having been printed are equal to each other when it is judged that the estimated time is not longer than the activation/termination time.

When notified by the controller 108 that the pixel density of the drawing data of the next page and that of the drawing data of the pages having been printed are equal to each other, the confirming unit 4308 waits until the estimated time lapses.

On the other hand, when not notified that the pixel density of the drawing data of the next page and that of the drawing data of the pages having been printed are equal to each other, the units of the engine 208 are terminated and reactivated.

Figure 9:
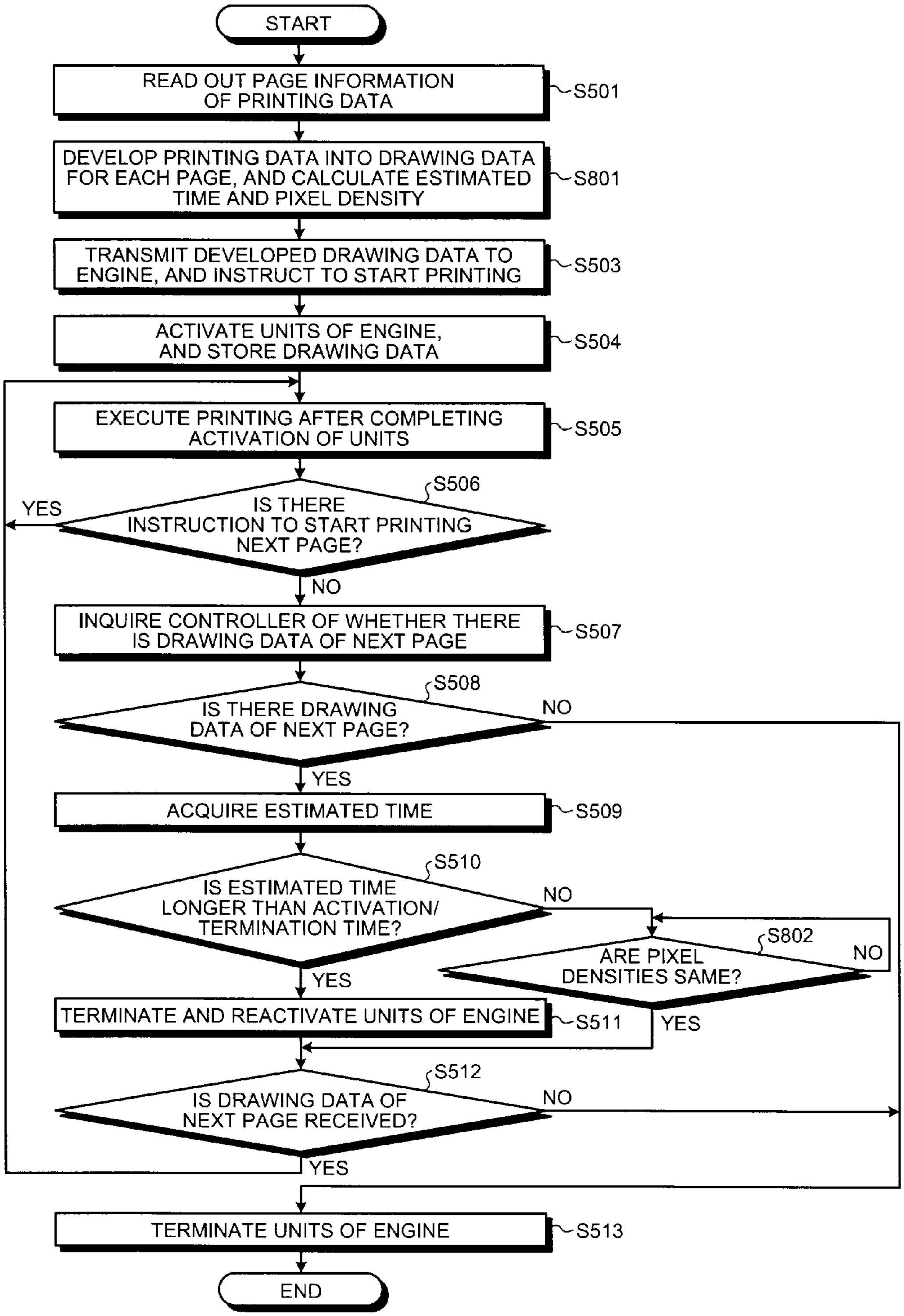
FIG. 9 is a flowchart of processing procedure from the start to the end of data printing according to the second embodiment.

Processing executed by a laser printer 1008 according to the second embodiment is now explained. Printing performed by the laser printer 1008 according to the second embodiment is different from the processing in the first embodiment only in that the pixel density of the drawing data is calculated and the units of the engine 208 are terminated. The processing is explained referring to FIG. 9. The other processing according to the second embodiment is the same as that of the first embodiment (Steps S501 and S502 to S513), and thus is not explained.

The determining unit 2208 reads out and acquires a control signal of printing data received by the transceiving unit 2100 (Step S501), develops the printing data into the drawing data and stores the drawing data in the storage unit 2300, calculates an estimated time, and calculates the pixel density of the developed drawing data (Step S801).

Thereafter, the processing similar to that in the first embodiment is performed (Steps S503 to S510). When the confirming unit 4308 judges that the estimated time is not longer than the activation/termination time (NO at Step S510), the confirming unit 4308 requests to confirm whether the pixel density of the drawing data of the next page and that of the drawing data of the pages having been printed are equal to each other (Step S802).

When the confirming unit 4308 is notified by the controller 108 that the pixel density of the drawing data of the next page and that of the drawing data of the pages having been printed are equal to each other (YES at Step S802), the process proceeds to Step S512 as in the first embodiment.

On the other hand, when the confirming unit 4308 is not notified that the pixel density of the drawing data of the next page and that of the drawing data of the pages having been printed are equal to each other (NO at Step S802), the units of the engine 208 are terminated and reactivated as in the first embodiment (Step S511).

As can be seen, in the present embodiment, the determining unit 2208 of the controller 108 calculates the pixel density of drawing data and judges whether the pixel densities of drawing data are equal to each other for each page, and the confirming unit 4308 of the engine 208 inquires the controller 108 of whether the pixel densities of the drawing data are equal to each other for each page, and then terminates or reactivates the units of the engine 208. Accordingly, rotation of the polygon mirror can be adjusted efficiently according to the pixel densities of drawing data, and efficient printing can be performed.

In the first embodiment, the controller 100 calculates an estimated time of drawing data based on the data amount of the drawing data and the processing speed of the controller 100, and the engine 200 compares the estimated time and the activation/termination time of each unit of the engine 200 to perform efficient printing. However, when the type of sheets on which printing data is to be printed (hereinafter, "paper type") changes, for example, from normal paper to high quality paper or from normal paper to recycled paper, the speed of feeding sheets on which a toner image is to be transcribed needs to be adjusted according to the paper type, and accordingly a unit of an engine is terminated, and reactivated. In the following example, printing is performed when the paper type is different for each page of drawing data.

Figure 10:
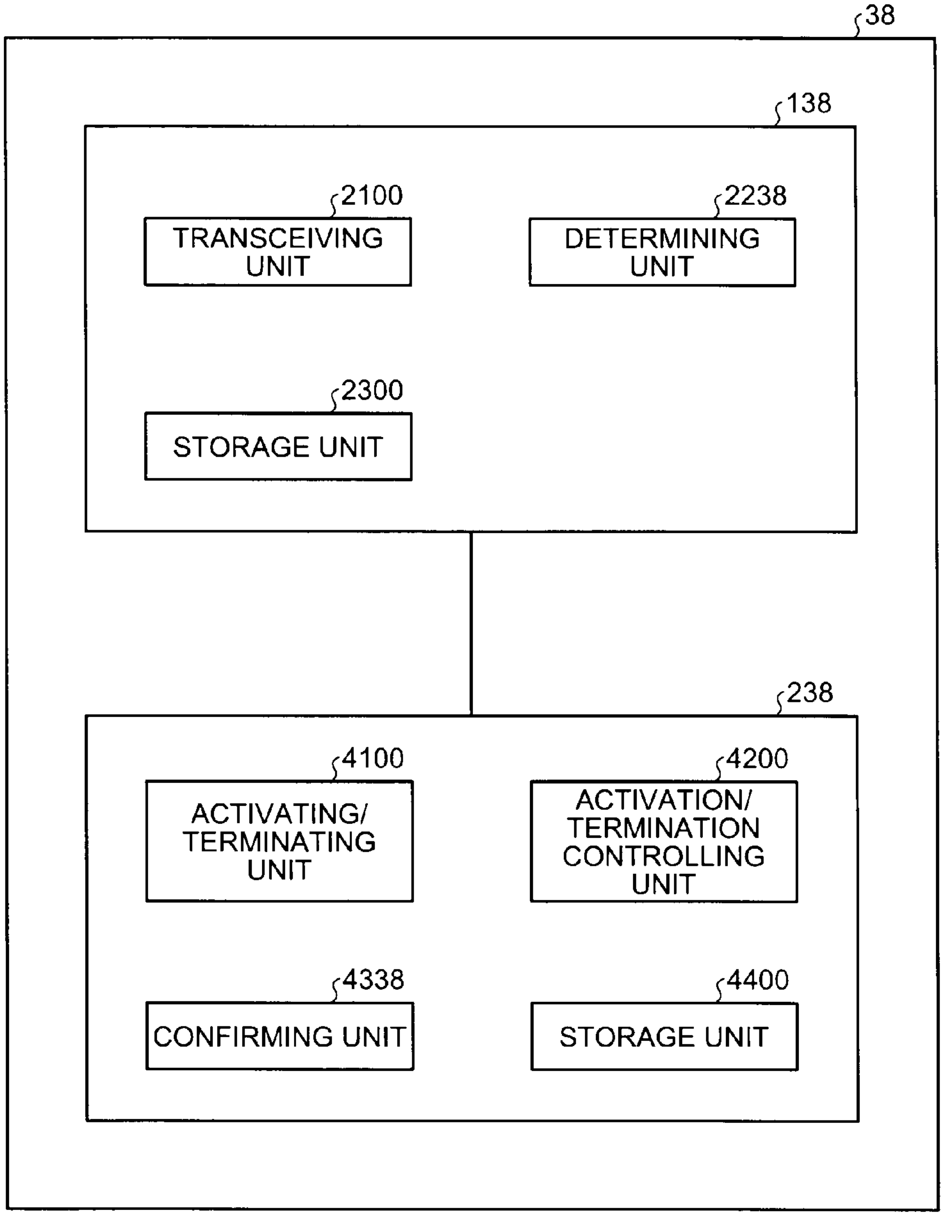
FIG. 10 is a block diagram of a functional configuration of a main unit according to a third embodiment of the present invention.

FIG. 10 is a block diagram of a physical configuration of a main unit 38 according to a third embodiment of the present invention. The main unit 38 according to the third embodiment is different from the main unit 2 according to the first embodiment in that the main unit 38 includes a controller 138 and an engine 238 different from the counterparts according to the first embodiment. In the following example, the same components as those of the first embodiment are given the same reference numerals, and are not explained again. The controller 138 is now explained.

The controller 138 includes a determining unit 2238 different from the determining unit 2200 according to the first embodiment.

The determining unit 2238 performs processing similar to the processing that the determining unit 2200 according to the first embodiment performs, and additionally, reads out paper type information (the type of sheets on which drawing data is to be printed such as recycled paper, high quality paper, normal paper, a post card, an envelop, a thick paper, and an overhead projector (OHP) sheet) from a control signal of printing data received by the transceiving unit 2100, and identifies adjacent pages that are different in paper type information with one another.

When requested by the engine 238 to confirm the paper type information, the determining unit 2238 notifies the engine 238 of a result of identifying the paper type information. The engine 238 is now explained.

The engine 238 is different from the engine 200 according to the first embodiment in that the engine 238 includes a confirming unit 4338 different from the confirming unit 4300 according to the first embodiment.

The confirming unit 4338 performs processing similar to the processing that the confirming unit 4300 according to the first embodiment performs, and additionally, requests to confirm whether the paper type information of a sheet on which the drawing data of a next page is to be printed is the same as that of sheets on which the drawing data have been printed when it is judged that the estimated time is not longer than the activation/termination time.

When notified by the controller 108 that the paper type information of a sheet on which the drawing data of a next page is to be printed is the same as the paper type information of the sheets on which the drawing data have been printed, the confirming unit 4338 waits until the estimated time lapses.

On the other hand, when not notified that the paper type information of a sheet on which the drawing data of a next page is to be printed is the same as the paper type information of the sheets on which the drawing data have been printed, the confirming unit 4338 terminates and reactivates the units of the engine 208.

Figure 11:
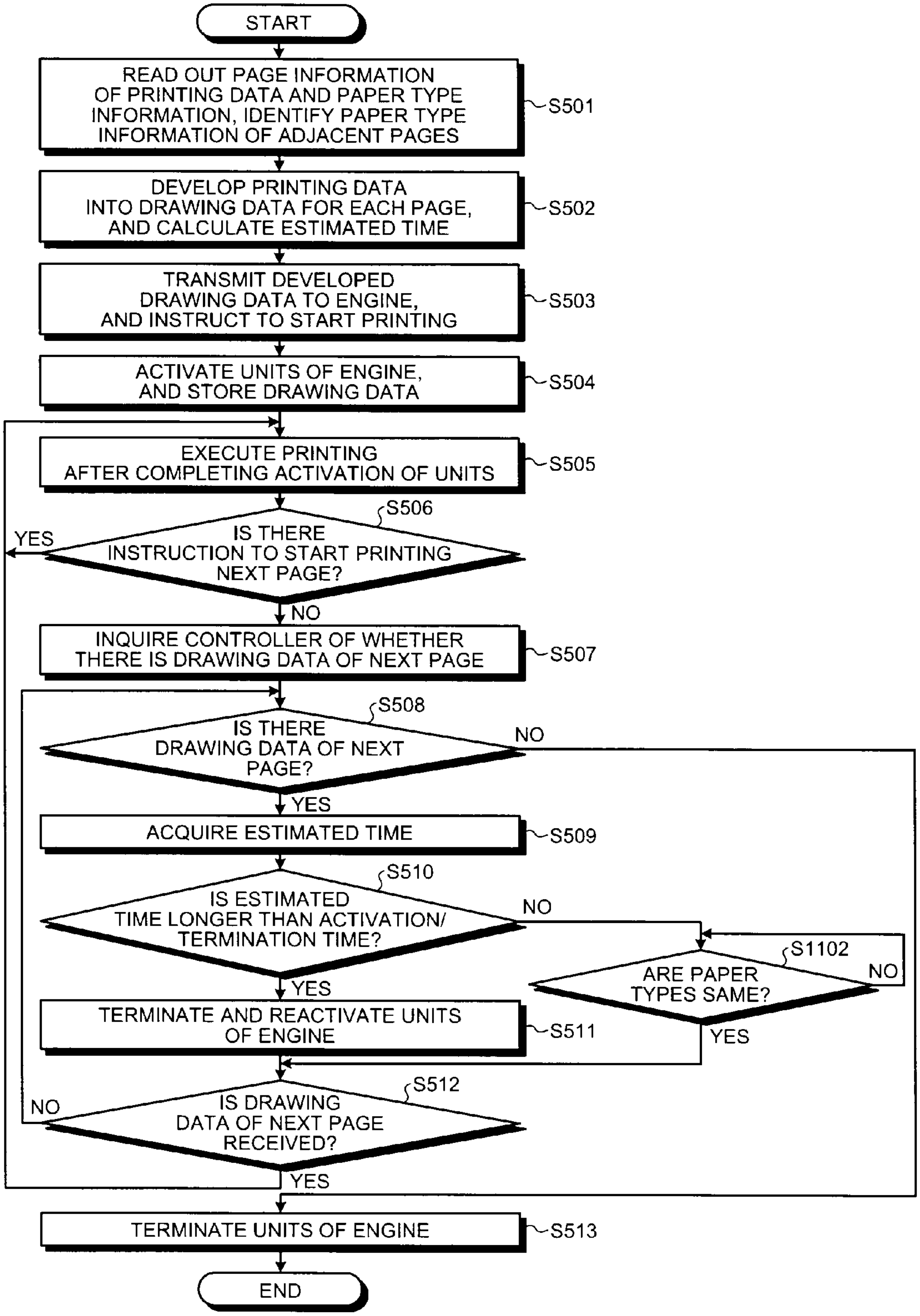
FIG. 11 is a flowchart of processing procedure from the start to the end of data printing according to the third embodiment.

Processing executed by a laser printer 1038 according to the third embodiment is now explained. Printing performed by the laser printer 1038 according to the third embodiment is different from the processing in the first embodiment only in that the paper type information of a sheet on which the drawing data is to be printed is identified, and the units of the engine 238 are terminated. The processing is explained referring to FIG. 11. The other processing according to the third embodiment is the same as that according to the first embodiment (Steps S502 to S513), and thus is not explained.

The determining unit 2238 reads out and acquires page information and paper type information from a control signal of printing data received by the transceiving unit 2100 (Step S1101). Thereafter, as in the first embodiment, the determining unit 2238 develops the printing data into drawing data and stores the drawing data in the storage unit 2300, calculates an estimated time, and calculates the pixel density of the developed drawing data (Step S502).

Thereafter, the processing similar to that in the first embodiment is performed (Steps S503 to S510). When it is judged that the estimated time is not longer than the activation/termination time (NO at Step S510), the confirming unit 4338 requests to confirm whether the paper type information of a sheet on which the drawing data of a next page is to be printed is the same as that of sheets on which the drawing data have been printed (Step S1102).

When the confirming unit 4338 is notified by the controller 108 that the paper type information of the sheet on which the drawing data of a next page is to be printed is the same as that of the sheets on which the drawing data have been printed (YES at Step S1102), the process proceeds to Step S512 as in the first embodiment.

On the other hand, when not notified that the paper type information of the sheet on which the drawing data of a next page is to be printed is the same as that of the sheets on which the drawing data have been printed (NO at Step S1102), the confirming unit 4338 terminates and reactivates the units of the engine 208 as in the first embodiment (Step S511).

As can be seen, in the present embodiment, the determining unit 2238 of the controller 108 reads out a paper type of a sheet on which drawing data is to be printed from control information and identifies whether the paper types of adjacent pages are the same with each other, and the confirming unit 4338 of the engine 238 inquires the controller 138 of whether the paper type information of the adjacent pates are the same with each other, and then terminates or reactivates the units of the engine 238. Accordingly, the speed of feeding sheets on which a toner image is to be transcribed can be adjusted according to the paper type of a sheet on which the drawing data is to be printed, and efficient printing can be performed.

In the first embodiment, the controller 100 calculates an estimated time of drawing data based on the data amount of the drawing data and the processing speed of the controller 100, and the engine 200 compares the estimated time and an activation/termination time of each unit of the engine 200 to perform efficient printing. When paper jam occurs during printing of drawing data, the engine 200 receives drawing data from the controller 100, but not being able to print the data. In such a case, printing is resumed after the jam is eliminated, the drawing data of a single page is possibly printed redundantly. Printing in a case when jam occurs during printing of drawing data is explained.

Figure 12:
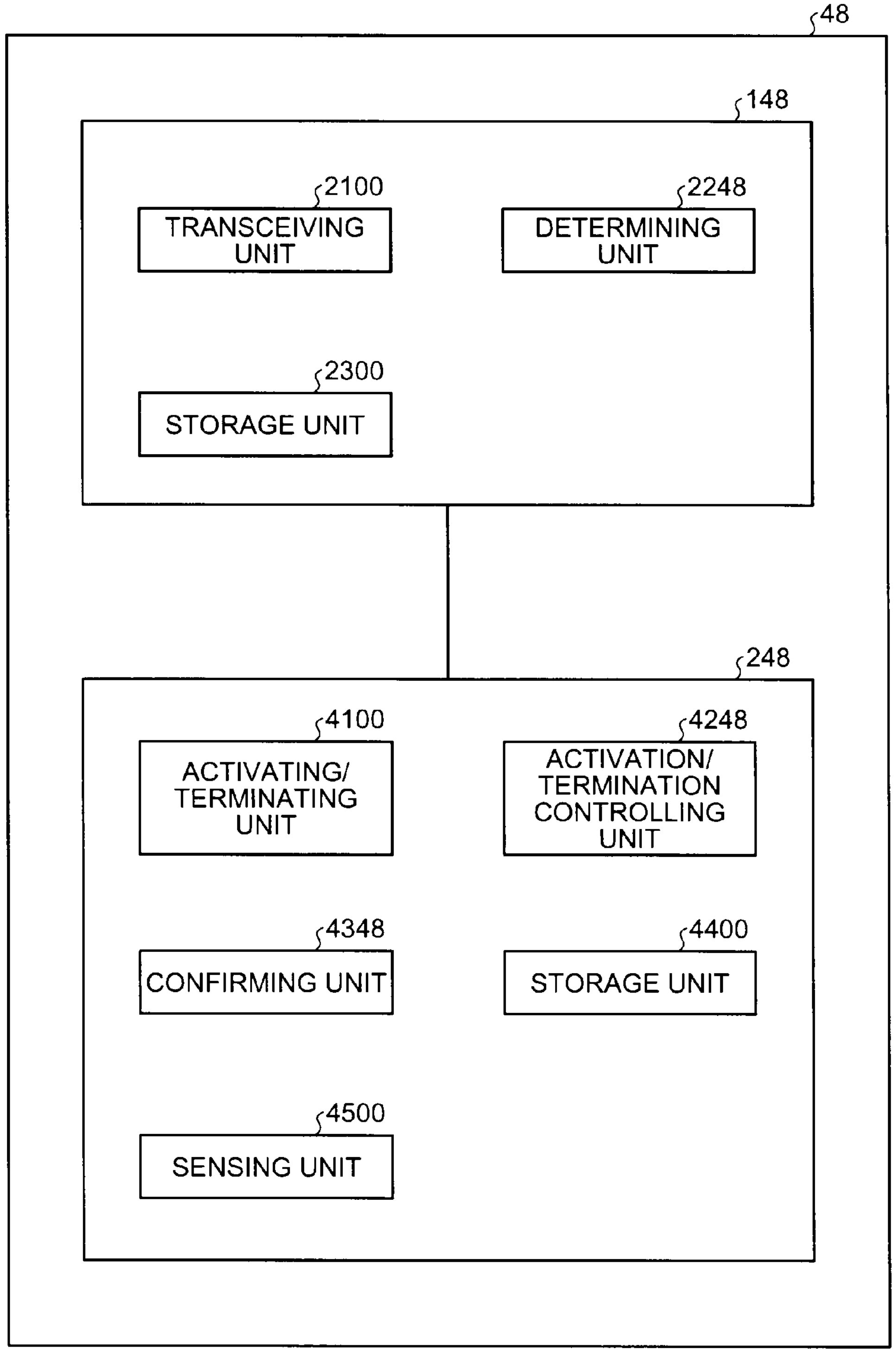
FIG. 12 is a block diagram of a functional configuration of a main unit according to a fourth embodiment of the present invention.

FIG. 12 is a block diagram of a physical configuration of a main unit 48 according to a fourth embodiment of the present invention. The main unit 48 according to the fourth embodiment is different from the main unit 2 according to the first embodiment in that the main unit 48 includes a controller 148 and an engine 248 different from the counterparts in the first embodiment. In the following example, the same components as those of the first embodiment are given the same reference numerals, and are not explained again. The controller 148 is explained first.

The controller 148 includes a determining unit 2248 different from the determining unit 2200 according to the first embodiment.

The determining unit 2248 performs processing similar to the processing that the determining unit 2200 according to the first embodiment performs, and additionally, deletes drawing data of a next page stored in the storage unit 2300 when the determining unit 2248 is notified by the engine 248 that a sheet on which the drawing data is to be printed has jammed. After deleting the drawing data of the next page, the determining unit 2248 notifies the engine 248 of the deletion. The engine 248 is now explained.

The engine 248 is different from the engine 200 in that the engine 248 includes an activation/termination controlling unit 4248 and a confirming unit 4348 different from the activation/termination controlling unit 4200 and the confirming unit 4300 according to the first embodiment, and additionally includes a sensing unit 4500.

The activation/termination controlling unit 4248 performs processing similar to the processing that the activation/termination controlling unit 4200 according to the first embodiment performs, and instructs the activating/terminating unit 4100 to terminate the units of the engine 248 when the activation/termination controlling unit 4248 is notified by the controller 148 that the drawing data of the next page has been deleted.

The confirming unit 4348 performs processing similar to the processing that the confirming unit 4300 according to the first embodiment performs, and additionally, notifies the controller 148 of jam of sheets when the sensing unit 4500 senses it.

The sensing unit 4500 senses jam of sheets that occurs during printing of drawing data.

Figure 13:
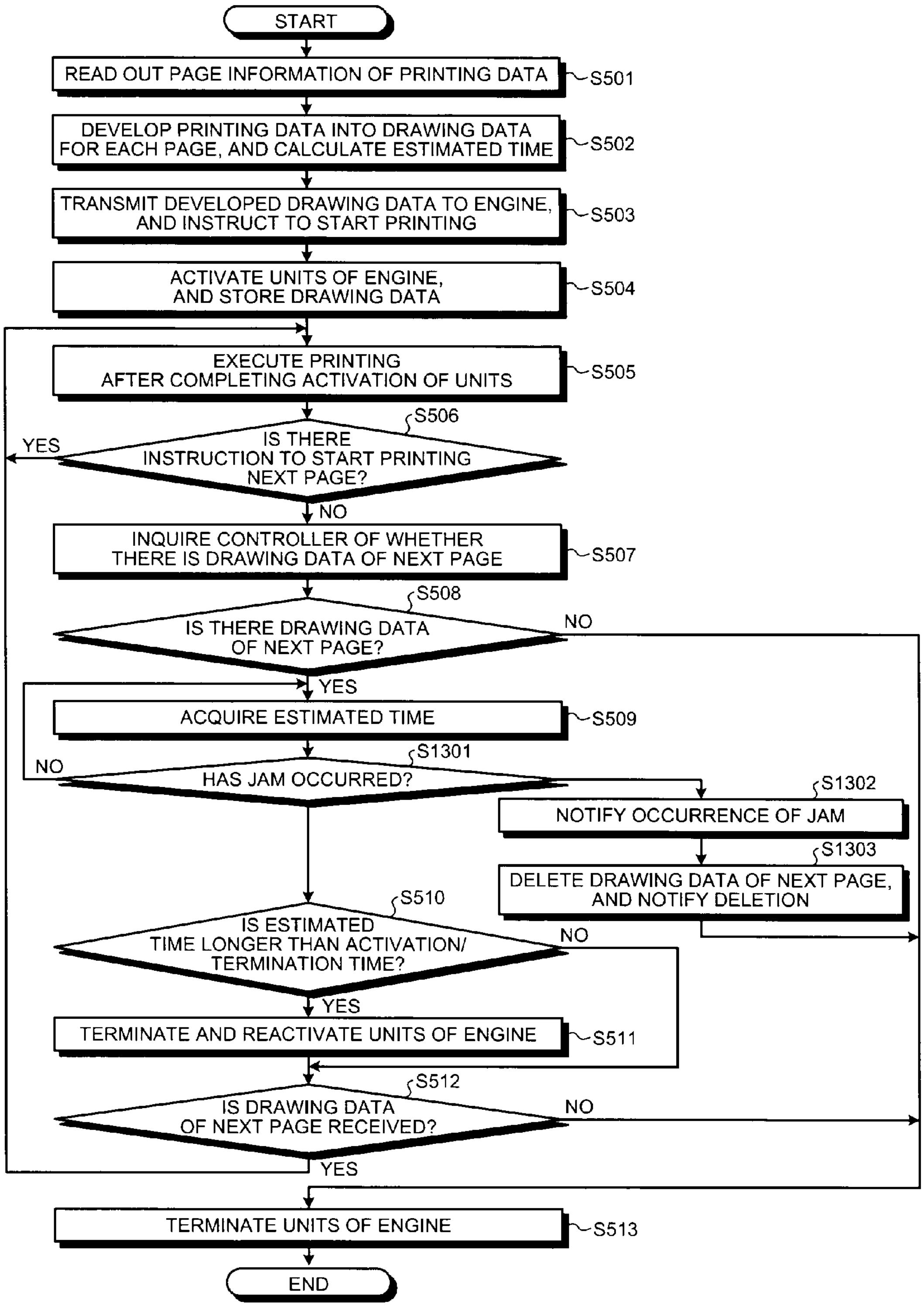
FIG. 13 is a flowchart of processing procedure from the start to the end of data printing according to the fourth embodiment.
Figure 14:
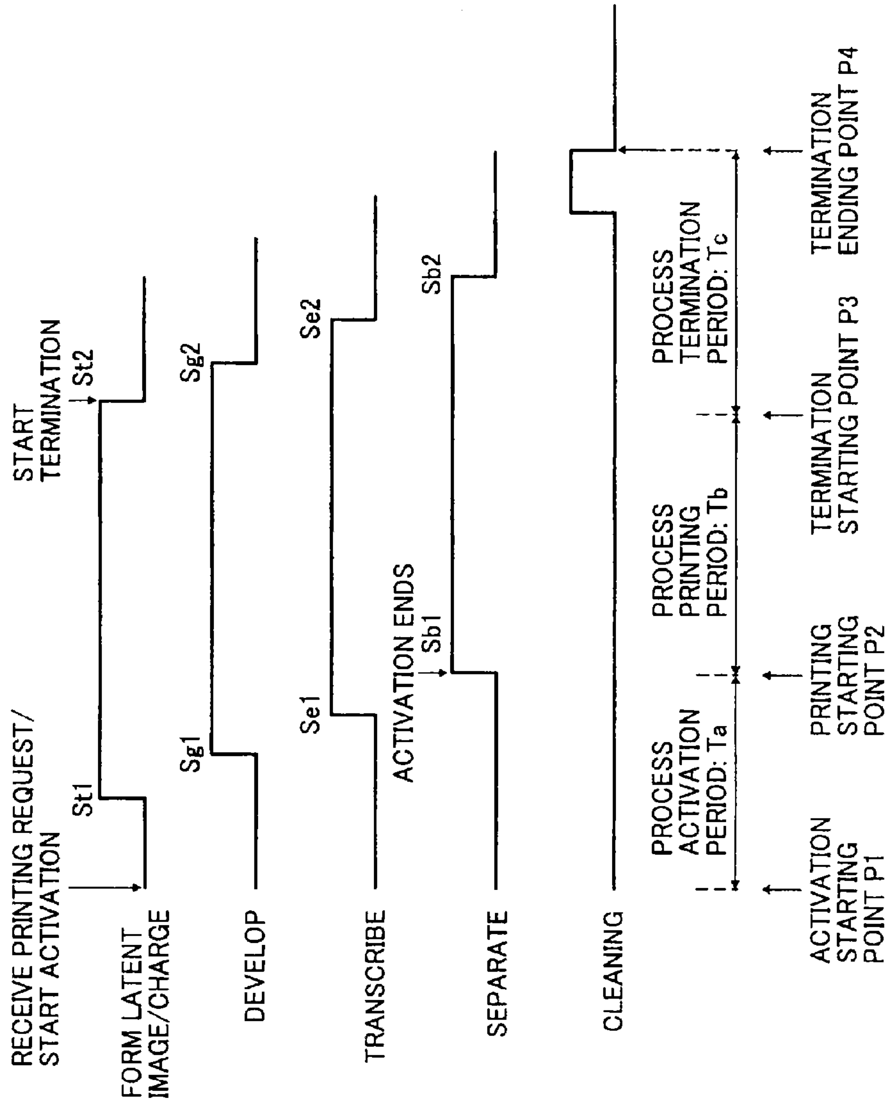
PRIOR ART FIG. 14
FIG. 14 is a timing chart of printing after an instruction to start printing is received by each unit of an engine in a conventional image forming apparatus.
Figure 15:
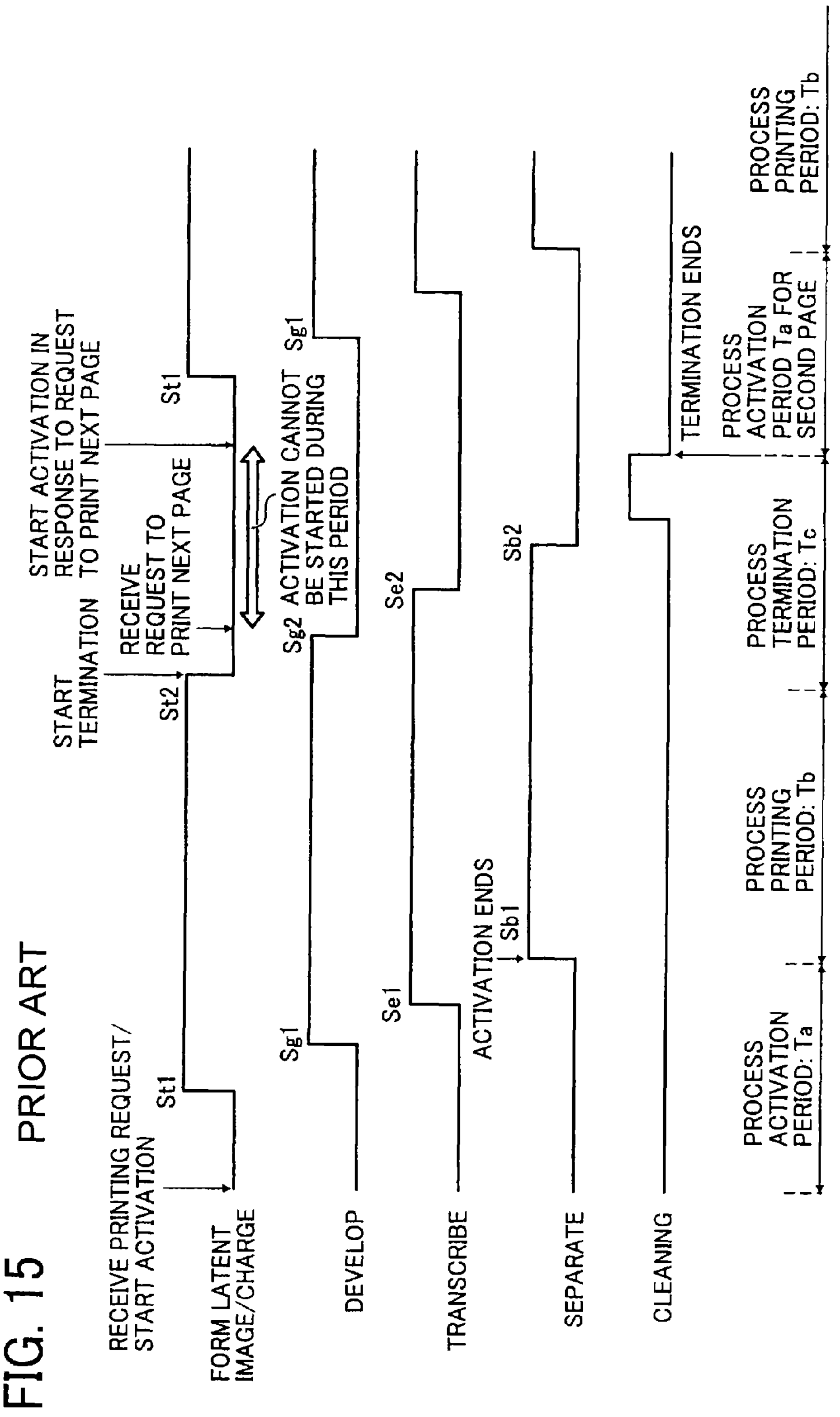
FIG. 15 PRIOR ART
FIG. 15 is a timing chart of printing after an instruction to start printing a next page is received by each unit of the engine in the conventional image forming apparatus.

Processing executed by a laser printer 1048 according to the fourth embodiment is now explained. Printing performed by the laser printer 1048 according to the fourth embodiment is different from the processing according to the first embodiment only in that jam of sheets is sensed and drawing data of a next page is deleted. The processing is explained referring to FIG. 13. The other processing according to the fourth embodiment is the same as that according to the first embodiment (Steps S501 to S513), and thus is not explained.

At Step S509, when the confirming unit 4348 has received an estimated time of drawing data of a next page from the controller 148 (Step S508), the sensing unit 4500 senses whether jam of sheets has occurred (Step S1301).

When the sensing unit 4500 senses jam of sheets (YES at Step S1301), the confirming unit 4348 notifies the controller 148 of the jam (Step S1302).

When notified by the engine 248 of the jam, the determining unit 2248 of the controller 148 deletes the drawing data of a next page stored in the storage unit 2300 and notifies the engine 248 of the deletion (Step S1303).

Thereafter, when notified by the controller 148 that the drawing data of the next page has been deleted, the activation/termination controlling unit 4248 instructs the activating/terminating unit 4100 to sequentially terminate the charging unit 11, the optical writing unit 12, the developing unit 13, the transcribing unit 14, the separating unit 15, the cleaning unit 16, and the like, and the activating/terminating unit 4100 terminates the units (Step S513).

As can be seen, in the present embodiment, the sensing unit 4500 of the engine 248 senses jam of sheets, the confirming unit 4348 notifies the controller 148 of the jam, and the determining unit 2248 deletes drawing data of a next page stored in the storage unit 2300. Accordingly, even when jam occurs during printing of drawing data, it is possible to avoid inconvenience of, for example, printing drawing data of a single page redundantly.

Although in the embodiments the sensing unit 4500 of the engine 248 senses whether jam of sheets has occurred, the sensing unit 4500 may sense abnormality of each unit of the engine by sensing, for example, that the rotational velocity of a polygon mirror of the optical writing unit 12 is not a rotational velocity corresponding to a pixel density, or that the light source of the optical writing unit 12 is not emitting laser light normally. With this configuration, it becomes possible to prevent drawing data from being printed on a sheet at a low accuracy for the reason that an electrostatic latent image cannot be formed according to an original setting, and for other reasons.

In the embodiments, the sensing unit 4500 senses whether jam of sheets has occurred during printing. However, jam may occur at a timing of activating or terminating the units of the engine 248. For such a case, the sensing unit 4500 may sense jam of sheets at the timing of activating or terminating the units of the engine. In such a case, because the sensing unit 4500 senses whether jam of sheets has occurred at a plurality of timing, further efficient printing can be performed.

According to one aspect of the present invention, efficient printing can be performed, and it becomes possible to suppress degradation of each unit of the engine during printing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:

a controller that issues a print instruction; and an engine that performs a printing in response to the print instruction from the controller, wherein the controller includes a determining unit that calculates an estimated time until drawing data for each page to be used in the printing is transmitted to the engine, and transmits the drawing data for each page, an instruction to print the drawing data for each page, and the estimated time to the engine, and the engine includes an activating/terminating unit that activates or terminates each unit of the engine, a confirming unit that judges whether the print instruction for each page is received, and when the print instruction for each page is not received, inquires the controller of whether there is drawing data of a next page, and when it is confirmed that there is the drawing data of the next page, acquires the estimated time to judge whether the estimated time is longer than an activation/termination time that is a sum of a time required for activating each unit of the engine and a time required for terminating each unit of the engine, and an activation/termination controlling unit that controls the activating/terminating unit to activate or terminate each unit of the engine when it is judged that the estimated time is longer than the activation/termination time.

2. The image forming apparatus according to claim 1, wherein the determining unit further calculates a pixel density for each page of the drawing data, judges whether the pixel densities of the drawing data are different for each page, and when the pixel densities are different for each page, notifies the engine that the pixel densities are different for each page in response to an inquiry from the engine, and the confirming unit further inquires the controller of whether the pixel densities of the drawing data are different for each page, and when the confirming unit is notified that the pixel densities are different for each page, the activation/termination controlling unit controls the activating/terminating unit to terminate and reactivate each unit of the engine even when it is judged that the estimated time is equal to or shorter than the activation/termination time.

3. The image forming apparatus according to claim 1, wherein the determining unit further acquires paper type information indicating a type of a sheet on which the drawing data is to be printed, judges whether the pixel densities of the drawing data are different for each page, and when the pixel densities are different for each page, notifies the engine that the pixel densities are different for each page in response to an inquiry from the engine, and the confirming unit further inquires the controller of whether the pixel densities of the drawing data are different for each page, and when the confirming unit is notified that the pixel densities are different for each page, the activation/termination controlling unit controls the activating/terminating unit to terminate and reactivate each unit of the engine even when it is judged that the estimated time is equal to or shorter than the activation/termination time.

4. The image forming apparatus according to claim 1, wherein the engine further includes a sensing unit that senses abnormality of each unit of the engine, the controller deletes the drawing data that has been converted when the controller is notified that there is abnormality in a unit of the engine, and notifies the engine that the drawing data has been deleted, the confirming unit notifies the controller of the abnormality of the unit of the engine when the abnormality of the unit of the engine is sensed, and the activation/termination controlling unit controls the activating/terminating unit to terminate each unit of the engine when the activation/termination controlling unit is notified by the controller that the drawing data has been deleted.

5. The image forming apparatus according to claim 4, wherein the sensing unit senses the abnormality during termination of each unit of the engine after pages of the drawing data are printed or at a timing of activating each unit of the engine after pages of the drawing data are printed or before a page next to the pages of the drawing data having been printed is printed.

6. The image forming apparatus according to claim 5, wherein the sensing unit senses a jam of a sheet as the abnormality.

7. An image forming method for an image forming apparatus including a controller that issues a print instruction and an engine that performs a printing in response to the print instruction from the controller, the image forming method comprising:

determining including the controller calculating an estimated time until drawing data for each page to be used in the printing is transmitted to the engine and transmitting the drawing data for each page, an instruction to print the drawing data for each page, and the estimated time to the engine, and activating/terminating including the engine activating or terminating each unit of the engine, judging whether the print instruction for each page is received, and when the print instruction for each page is not received, inquiring the controller of whether there is drawing data of a next page, and when it is confirmed that there is the drawing data of the next page, acquiring the estimated time to judge whether the estimated time is longer than an activation/termination time that is a sum of a time required for activating each unit of the engine and a time required for terminating each unit of the engine, and activating or terminating each unit of the engine when it is judged that the estimated time is longer than the activation/termination time.

8. The image forming method according to claim 7, wherein the determining further includes the controller calculating a pixel density for each page of the drawing data, judging whether the pixel densities of the drawing data are different for each page, and when the pixel densities are different for each page, notifying the engine that the pixel densities are different for each page in response to an inquiry from the engine, and the activating/terminating further includes the engine inquiring the controller of whether the pixel densities of the drawing data are different for each page, and when it is notified that the pixel densities are different for each page, the activating/terminating further includes the engine terminating and reactivating each unit of the engine even when it is judged that the estimated time is equal to or shorter than the activation/termination time.

9. The image forming method according to claim 7, wherein the determining further includes the controller acquiring paper type information indicating a type of a sheet on which the drawing data is to be printed, judging whether the pixel densities of the drawing data are different for each page, and when the pixel densities are different for each page, notifying the engine that the pixel densities are different for each page in response to an inquiry from the engine, and the activating/terminating further includes the engine inquiring the controller of whether the pixel densities of the drawing data are different for each page, and when it is notified that the pixel densities are different for each page, the activating/terminating further includes the engine terminating and reactivating each unit of the engine even when it is judged that the estimated time is equal to or shorter than the activation/termination time.

10. The image forming method according to claim 7, wherein the engine includes a sensing unit that senses abnormality of each unit of the engine, the image forming method further comprises:

sensing including the sensing unit sensing the abnormality of each unit of the engine; and deleting including the controller deleting the drawing data that has been converted when the controller is notified that there is abnormality in a unit of the engine and notifying the engine that the drawing data has been deleted, the activating/terminating further includes the engine notifying the controller of the abnormality of the unit of the engine when the abnormality of the unit of the engine is sensed, and the activating/terminating further includes the engine terminating each unit of the engine when it is notified by the controller that the drawing data has been deleted.

11. The image forming method according to claim 10, wherein the sensing includes the sensing unit sensing the abnormality during termination of each unit of the engine after pages of the drawing data are printed or at a timing of activating each unit of the engine after pages of the drawing data are printed or before a page next to the pages of the drawing data having been printed is printed.

12. The image forming method according to claim 11, wherein the sensing includes the sensing unit sensing a jam of a sheet as the abnormality.

* * * * *